(12) United States Patent
Chen et al.

(10) Patent No.: US 11,108,817 B2
(45) Date of Patent: Aug. 31, 2021

(54) SQL INJECTION INTERCEPTION DETECTION METHOD AND DEVICE, APPARATUS AND COMPUTER READABLE MEDIUM

(71) Applicant: Beijing Baidu Netcom Science and Technology Co., Ltd., Beijing (CN)

(72) Inventors: Hui Chen, Beijing (CN); Qiang Huang, Beijing (CN); Tianyu Wang, Beijing (CN); Zhaoyi Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 380 days.

(21) Appl. No.: 16/156,997

(22) Filed: Oct. 10, 2018

(65) Prior Publication Data

US 2019/0306191 A1 Oct. 3, 2019

(30) Foreign Application Priority Data

Mar. 30, 2018 (CN) .......................... 201810274876.3

(51) Int. Cl.
*H04L 29/06* (2006.01)
*G06F 16/2455* (2019.01)

(52) U.S. Cl.
CPC .... *H04L 63/1466* (2013.01); *G06F 16/24561* (2019.01); *H04L 63/1416* (2013.01); *H04L 63/20* (2013.01)

(58) Field of Classification Search
CPC . H04L 63/1466; H04L 63/1416; H04L 63/20; H04L 63/1425; G06F 21/554
See application file for complete search history.

(56) References Cited

U.S. PATENT DOCUMENTS

| 2010/0299292 A1* | 11/2010 | Collazo | G06F 21/577 |
| | | | 706/14 |
| 2014/0201838 A1* | 7/2014 | Varsanyi | G06F 21/552 |
| | | | 726/23 |

FOREIGN PATENT DOCUMENTS

| CN | 1747502 A | 3/2006 |
| CN | 101609493 A | 12/2009 |
| CN | 102682047 A | 9/2012 |

(Continued)

OTHER PUBLICATIONS

First Chinese Office Action dated Dec. 25, 2018, received for corresponding Chinese Application No. 2018102748763.

(Continued)

*Primary Examiner* — Paul E Callahan
(74) *Attorney, Agent, or Firm* — Kinney & Lange, P.A.

(57) ABSTRACT

A method for detecting SQL injection interception is provided. The method includes: detecting a received SQL instruction according to a SQL syntax tree rule to determine that the received SQL instruction is a malicious instruction; and analyzing the received SQL instruction by using an analysis model to determine that the received SQL instruction is a potentially malicious instruction, in a case that the received SQL instruction is not determined to be a malicious instruction according to the SQL syntax tree rule. The method can combine the online detection and the offline analysis to intercept the invading malicious SQL commands, and can also find and supplement the loopholes of the rules through offline analysis.

8 Claims, 3 Drawing Sheets

(56) References Cited

FOREIGN PATENT DOCUMENTS

| CN | 103186733 A | 7/2013 |
|---|---|---|
| CN | 106357696 A | 1/2017 |
| CN | 107122658 A | 9/2017 |
| CN | 107229849 A | 10/2017 |

OTHER PUBLICATIONS

International Search Report dated Mar. 30, 2018, received for corresponding Chinese Application No. 2018102748763.
Second Chinese Office Action dated Jan. 31, 2019, received for corresponding Chinese Application No. 2018102748763.

* cited by examiner

SQL INJECTION INTERCEPTION DETECTION METHOD AND DEVICE, APPARATUS AND COMPUTER READABLE MEDIUM

CROSS-REFERENCE TO RELATED APPLICATION

This application claims priority to Chinese Patent Application No. 201810274876.3, filed on Mar. 30, 2018, which is hereby incorporated by reference in its entirety.

TECHNICAL FIELD

The present disclosure relates to the field of network security technologies, and in particular, to a SQL injection interception detection method and device, apparatus, and a computer readable medium.

BACKGROUND

At present, Internet companies face a large number of hacker attacks, and a considerable proportion of them are SQL injection attacks.

The current SQL (Structured Query Language) injection interception is mainly blocked by WAF (Web Application Firewall). WAF uses regular rules for interception and detection. However, due to many complicated situations that are hard to describe, the regular rule singly based on text characteristics has a high false positive rate.

SUMMARY

Embodiments of the present disclosure provide a SQL injection interception detection method, device, apparatus, and a computer readable medium to solve or alleviate one or more technical problems in the related art.

In the first aspect, embodiments of the present disclosure provide a SQL injection interception detection method. The method includes:

detecting a received SQL instruction according to a SQL syntax tree rule to determine that the received SQL instruction is a malicious instruction;

analyzing the received SQL instruction by using an analysis model to determine that the received SQL instruction is a potentially malicious instruction, in a case that the received SQL instruction does not hit the syntax tree rule;

In combination with the first aspect, in a first embodiment of the first aspect of the present disclosure, the step of detecting a received SQL instruction according to a SQL syntax tree rule to determine that the received SQL instruction is a malicious instruction includes:

parsing a SQL statement in the received SQL instruction into a syntax tree structure;

determining that the syntax tree structure matches a feature of a syntax tree in a blacklist; and intercepting the SQL instruction with the matched syntax tree structure.

In combination with the first aspect, in a second embodiment of the first aspect of the present disclosure, the step of analyzing the received SQL instruction by using an analysis model to determine that the received SQL instruction is a potentially malicious instruction includes:

generating a vector of the received SQL instruction according to a grammar rule;

calculating the similarity between the vector of the received SQL instruction and a vector sample of the malicious SQL instruction; determining the received SQL instruction, the vector of which has a similarity larger than a preset threshold, to be a malicious instruction.

In combination with the first aspect or any embodiments of the first aspect, a third embodiment of the first aspect of the present disclosure further comprises the steps of:

adding a syntax structure rule of the malicious SQL instruction to a blacklist in response to the received SQL instruction, in the case that the received SQL instruction is determined to be a malicious instruction.

In the second aspect, embodiments of the present disclosure provide a SQL injection interception detection device. The device includes:

a detection module configured for detecting a received SQL instruction according to a SQL syntax tree rule to determine that the received SQL instruction is a malicious instruction;

an analysis module configured for analyzing the received SQL instruction by using an analysis model to determine that the received SQL instruction is a potentially malicious instruction, in a case that the received SQL instruction does not hit the syntax tree rule.

In combination with the second aspect, in a first embodiment of the second aspect of the present disclosure, the detection module includes:

a parsing submodule configured for parsing a SQL statement in the received SQL instruction into a syntax tree structure;

an intercepting submodule configured for determining that the syntax tree structure matches a feature of a syntax tree in a blacklist; and intercepting the SQL instruction with the matched syntax tree structure.

In combination with the second aspect, in a second embodiment of the second aspect of the present disclosure, the analysis module includes:

a vector generation submodule configured for generating a vector of the received SQL instruction according to a grammar rule;

a similarity calculation submodule configured for calculating the similarity between the vector of the received SQL instruction and a vector sample of the malicious SQL instruction; determining the received SQL instruction, the vector of which has a similarity larger than a preset threshold, to be a malicious instruction.

In combination with the second aspect or any embodiments of the second aspect, a third embodiment of the second aspect of the present disclosure, further comprises: a blacklist update module configured for adding a syntax structure rule of the malicious SQL instruction to a blacklist in response to the received SQL instruction, in the case that the received SQL instruction is determined to be a malicious instruction.

The functions of the device may be implemented by a hardware or by a corresponding software implemented by the hardware. The hardware or software includes one or more modules corresponding to the functions described above.

In a possible design, the structure of the SQL injection interception detection device includes a processor and a memory. The memory is used to store a program that supports the SQL injection interception detection device to perform the SQL injection interception detection method in the above first aspect, and the processor is configured to perform the program stored in the memory. The SQL injection interception detection device may further comprise a communication interface for the SQL injection interception detection device to communicate with other apparatuses or communication networks.

In the third aspect, embodiments of the present disclosure provide a computer readable medium for storing computer software instructions used in the SQL injection interception detection device comprising a program involved in performing the SQL injection interception detection method of the above first aspect.

Some of the embodiments of the present disclosure can combine the online detection and the offline analysis to intercept the invading malicious SQL commands, and can also find and supplement the loopholes of the rules through offline analysis.

The above summary is for the purpose of illustration only and is not intended to be limiting. In addition to the illustrative aspects, embodiments, and features described above, further aspects, embodiments, and features of the present disclosure will be readily apparent from the following descriptions and the accompanying drawings.

BRIEF DESCRIPTION OF THE DRAWINGS

In the drawings, unless otherwise specified, the same reference numerals throughout the drawings represent the same or similar components or elements. The drawings are not necessarily to scale. It is to be understood that these drawings depict only some embodiments in accordance with the present disclosure are not to be considered as limiting the scope of the present disclosure.

DETAILED DESCRIPTION

In the following, only certain exemplary embodiments are briefly described. As one skilled in the art can recognize, the described embodiments may be modified in various different ways, without departing from the spirit or scope of the present disclosure. Accordingly, the drawings and description are to be regarded as essentially exemplary but not limiting. Embodiments of the present disclosure mainly provide a SQL injection interception detection method and device. The following describes the development of the technical solution by the following embodiments.

Figure 1:
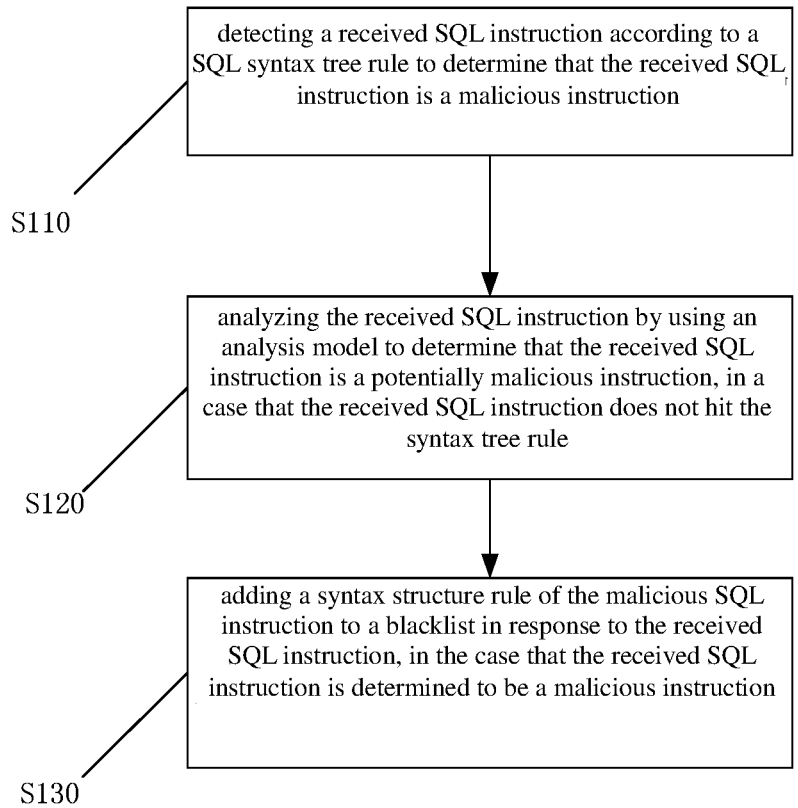
FIG. 1 is a schematic flowchart of the SQL injection interception detection method according to an embodiment of the present disclosure.

With reference to FIG. 1, a flowchart of the SQL injection interception detection method according to Embodiment 1 of the present disclosure is illustrated. Embodiment 1 provides a SQL injection interception detection method comprising steps of:

S110: detecting a received SQL instruction according to a SQL syntax tree rule to determine that the received SQL instruction is a malicious instruction. If so, the received SQL instruction may be intercepted.

In embodiments of the present disclosure, the SQL syntax tree rule is a SQL transformation rule that translates SQL instructions into corresponding syntax structures.

S120: analyzing the received SQL instruction by using an analysis model to determine that the received SQL instruction is a potentially malicious instruction, in a case that the received SQL instruction does not hit the syntax tree rule.

Figure 2:
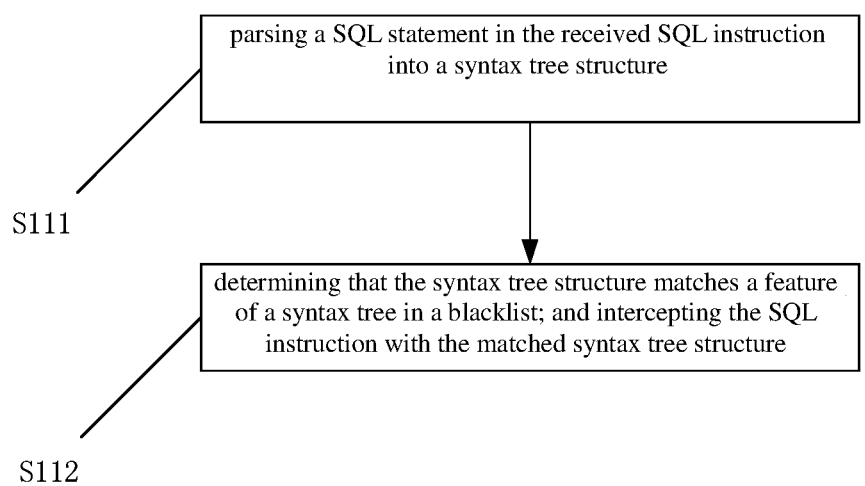
FIG. 2 is a schematic flowchart of the step S110 according to an embodiment of the present disclosure.

In a possible implementation, as shown in FIG. 2, the step S110 specifically includes:

S111: parsing a SQL statement in the received SQL instruction into a syntax tree structure.

For example, the received SQL statement is "select * from T1 where id='4' LIKE '%'". It is parsed into a syntax tree structure of "const_field LIKE const_field".

S112: determining that the syntax tree structure matches a feature of a syntax tree in a blacklist; and intercepting the SQL instruction with the matched syntax tree structure.

For example, according to the normal SQL statement, the rules may be set as: the subtrees on both sides of the LIKE operator cannot be constants. Therefore, the statements that the subtrees on both sides of LIKE are constants are added to the blacklist. Depending on this rule, the received SQL statement matches the syntax tree feature in the blacklist, so it is intercepted.

The analysis model may store a large number of correct SQL sample sets and maliciously injected SQL sample sets, and determine by analyzing the similarity of the received SQL instructions.

Figure 3:
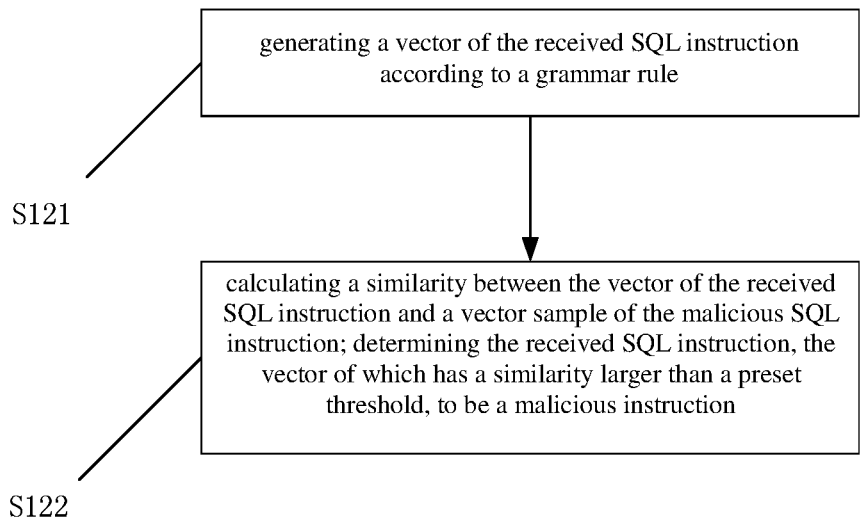
FIG. 3 is a schematic flowchart of the step S120 according to an embodiment of the present disclosure.

In a possible implementation, as shown in FIG. 3, the step S120 specifically includes:

S121: generating a vector of the received SQL instruction according to a grammar rule.

The SQL instruction may generate a vector whose subscript is based on the grammar rules in the YACC (Yet Another Compiler Compiler) syntax definition file. For example, if there are 1000 rules in the SQL syntax file, the generated vector has a dimension of 1000.

S122: calculating the similarity between the vector of the received SQL instruction and a vector sample of the malicious SQL instruction; determining the received SQL instruction, the vector of which has a similarity larger than a preset threshold, to be a malicious instruction.

In an embodiment, the similarity determination function employed is a Euclidean distance algorithm. For example, the similarity threshold may be set to 90%. If the similarity between the vector of the received SQL statement and the vector sample of the malicious SQL instruction reaches the threshold, the initial determination is that the received SQL instruction is a malicious instruction, and then the staff may be reminded by means of an alarm or the like to perform the review.

In addition, as a preferred way of the present embodiment, the similarity calculation may be further performed on the received SQL instruction and the correct SQL sample instruction, and then the two similarities are weighted and summed to obtain a final value, followed by determining whether the value reaches the set threshold, so as to determine whether the SQL instruction is a malicious instruction.

In the detection method of the present embodiment, a step S130 is further included: adding a syntax structure rule of the malicious SQL instruction to a blacklist in response to the received SQL instruction, in the case that the received SQL instruction is determined to be a malicious instruction.

In a case that the received SQL instruction is determined to be a malicious instruction, then the blacklist may be updated according to the syntax structure of the instruction.

Figure 4:
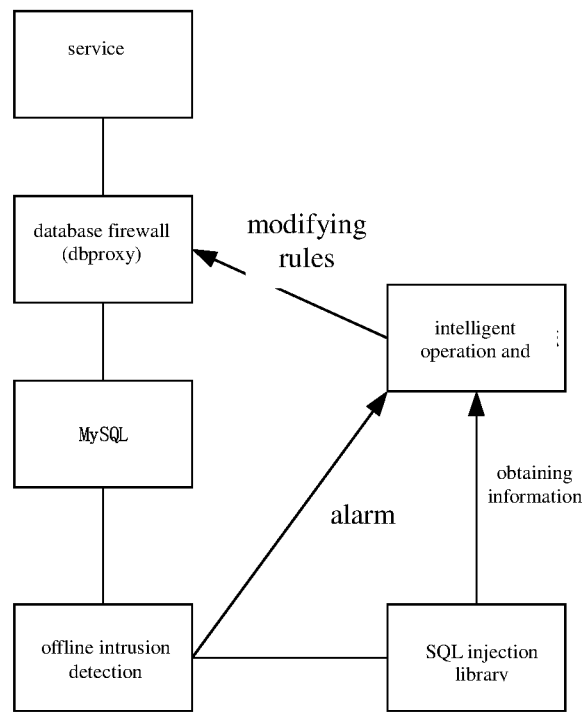
FIG. 4 is a schematic application view of the SQL injection interception detection method according to an embodiment of the present disclosure.

With reference to FIG. 4, a schematic application view of the interception detection method of the present disclosure is illustrated. In the present embodiment, the SQL instruction service is detected by the database firewall (dbproxy) to determine whether it is a malicious instruction. If so, the interception is performed directly. If not, the interception is not performed, and then the offline intrusion detection is performed. At the time of detection, similar matching is performed by using the SQL injection library, and when the similarity reaches the set threshold, an alarm is issued. Then, modification or addition of rules is performed for the database firewall by the intelligent operation and maintenance monitoring system (ARK).

Figure 5:
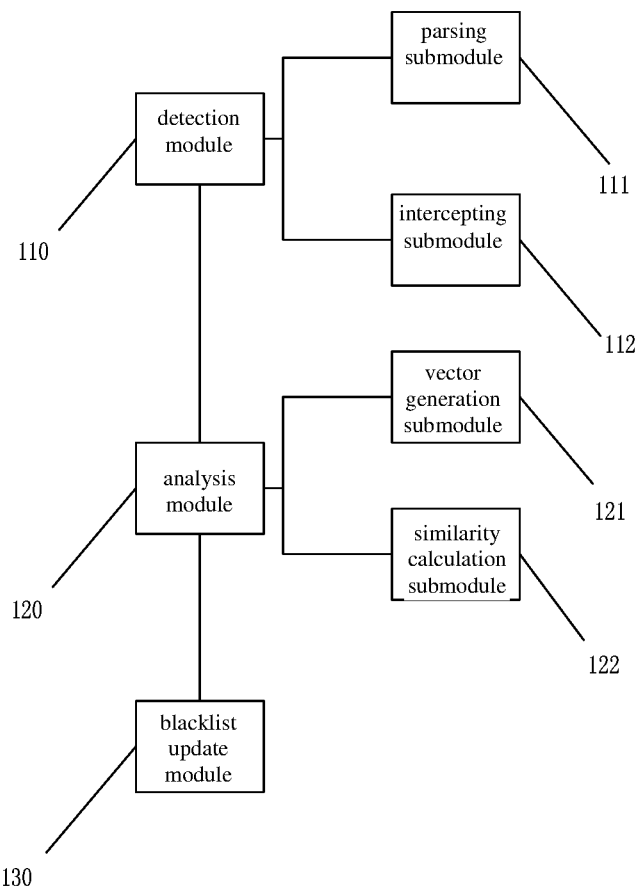
FIG. 5 is a schematic block view of the SQL injection interception detection device according to another embodiment of the present disclosure.

Embodiments of the present disclosure further provide a SQL injection interception detection device. With reference to FIG. 5, a schematic block view of the SQL injection interception detection device according to the present embodiment is illustrated. The SQL injection interception detection device of the present embodiment comprises a detection module 110, an analysis module 120 and a blacklist update module 130.

The detection module 110 is configured for detecting a received SQL instruction according to a SQL syntax tree rule to determine whether the received SQL instruction is a malicious instruction.

The detection module 110 includes:

a parsing submodule 111 configured for parsing a SQL statement in the received SQL instruction into a syntax tree structure, and an intercepting submodule 112 configured for determining that the syntax tree structure matches a feature of a syntax tree in a blacklist; and intercepting the SQL instruction with the matched syntax tree structure, The analysis module 120 is configured for analyzing the received SQL instruction by using an analysis model to determine that the received SQL instruction is a potentially malicious instruction, in a case that the received SQL instruction does not hit the syntax tree rule.

The analysis module 120 includes:

a vector generation submodule 121 configured for generating a vector of the received SQL instruction according to a grammar rule; and a similarity calculation submodule 122 configured for calculating the similarity between the vector of the received SQL instruction and a vector sample of the malicious SQL instruction; determining the received SQL instruction, the vector of which has a similarity larger than a preset threshold, to be a malicious instruction.

The blacklist update module 130 is configured for adding a syntax structure rule of the malicious SQL instruction to the blacklist according to the received SQL instruction in the case that the received SQL instruction is determined to be a malicious instruction.

The function of each module of the device in this embodiment is similar to the principle of the SQL injection interception detection method in the foregoing embodiments, and therefore will not be described again.

Figure 6:
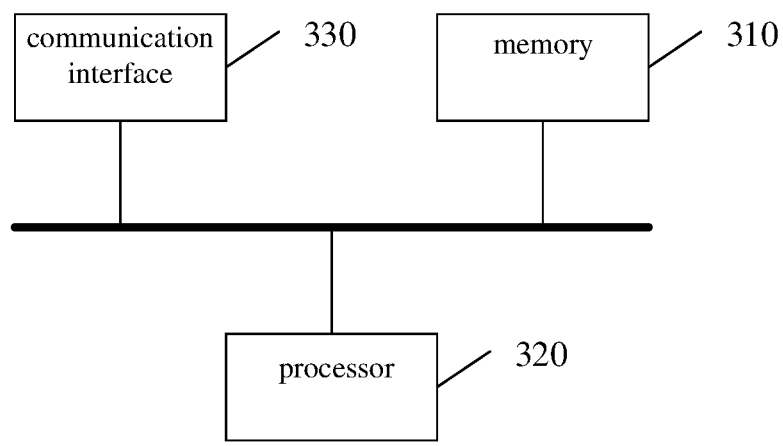
FIG. 6 is a schematic block view of the SQL injection interception detection apparatus according to an embodiment of the present disclosure.

Embodiments of the present disclosure further provide a SQL injection interception detection apparatus. As shown in FIG. 6, the apparatus comprises a memory 310 and a processor 320, wherein a computer program executable on the processor 320 is stored in the memory 310. The SQL injection interception detection method in the above embodiments is performed when the computer program is executed by the processor 320. The number of the memory 310 and the processor 320 may be one or more.

The apparatus further comprises:

a communication interface 330 used to communicate with an external device for data interactive transmission.

The memory 310 may include a high speed RAM memory and may also include a non-volatile memory such as at least one disk memory.

If the memory 310, the processor 320, and the communication interface 330 are implemented independently, the memory 310, the processor 320, and the communication interface 330 may be connected to each other through a bus and complete communication with each other. The bus may be an Industrial Standard Architecture (ISA) bus, a Peripheral Component Interconnect (PCI) bus, or an Extended Industry Standard Component (EISA) bus. The bus may be divided into an address bus, a data bus, a control bus, and the like. For ease of representation, only one thick line is shown for the bus in FIG. 6, but it does not mean that there is only one bus or one type of bus.

Optionally, in a specific embodiment, if the memory 310, the processor 320, and the communication interface 330 are integrated on one chip, the memory 310, the processor 320, and the communication interface 330 may complete communication with each other through the internal interface.

In the description of the present specification, the description with reference to the terms "one embodiment", "some embodiments", "example", "specific example", or "some examples" and the like means that specific features, structures, materials, or characteristics described in combination with the embodiments or examples are included in at least one embodiment or example of the present disclosure. Furthermore, the particular features, structures, materials, or characteristics described may be combined in a suitable manner in any one or more embodiments or examples. In addition, without contradicting each other, various embodiments or examples described in the specification, as well as features of various embodiments or examples, may be connected and combined by those skilled in the art.

Moreover, terms like "first", "second", are only used for description, and are not to be construed as indicating or implying a relative importance or implicitly indicating the number of technical features indicated. Thus, features defining "first" and "second" may include at least one of the features, either explicitly or implicitly. In the description of the present disclosure, the meaning of "a plurality" is two or more unless specifically and specifically defined otherwise.

Any process or method description in the flowcharts or otherwise described herein may be understood as a module, segment or portion of code representing executable instructions including one or more steps for implementing a particular logical function or process. And the scope of the preferred embodiments of the present disclosure includes additional implementations, in which the functions may be performed in a substantially simultaneous manner or in an opposite order relative to the order shown or discussed depending on the functions involved, which should be understood by those skilled in the art to which the embodiments of the present disclosure pertain.

The logic and/or steps represented in the flowchart or otherwise described herein. e.g., may be considered as an ordered list of executable instructions for implementing logical functions, may be embodied in any computer readable medium for being used by an instruction execution system, device or apparatus (a computer-based system, a system including a processor, or other system that may fetch instructions and execute instructions from an instruction execution system, device, or apparatus), or used in conjunction with these instructions to execute a system, device, or apparatus. For the purposes of this specification, a "computer readable medium" can be any apparatus that can contain, store, communicate, propagate, or transport a program for use in an instruction execution system, device, or apparatus, or in conjunction with such an instruction execution system, device, or apparatus.

The computer readable medium of the embodiments of the present disclosure may be a computer readable signal medium or a computer readable storage medium or any combination of the two. More specific examples of computer readable storage medium at least (non-exhaustive list) include the following: electrical connection (electronic device) with one or more wires, portable computer disk cartridge (magnetic device), random access memory (RAM), read only memory (ROM), erasable editable read only memory (EPROM or Flash memory), fiber optic device, and portable read only memory (CDROM). Additionally, a computer readable storage medium may even be a paper or other suitable medium on which the program can be printed, because the program can be obtained electronically, for example by optical scanning of paper or other medium, followed by editing, interpretation or, if necessary, processing in other suitable manner, and then storing it in computer memory.

In an embodiment of the present disclosure, a computer readable signal medium may include a data signal propagating in a baseband or as part of a carrier, carrying computer readable program code. Such propagated data signals may take a variety of forms including, but not limited to, electromagnetic signals, optical signals, or any suitable combination of the foregoing. The computer readable signal medium may also be any computer readable medium other than a computer readable storage medium, which may transmit, propagate, or transport a program for use by or in combination with an instruction execution system, an input method, or a device. Program code embodied on a computer readable medium may be transmitted by any suitable medium, including but not limited to wireless, wire, optical cable, radio frequency (RF), and the like, or any suitable combination of the foregoing.

It should be understood that portions of the present disclosure may be implemented in hardware, software, firmware or a combination thereof. In the above-described embodiments, multiple steps or methods, devices, modules or apparatuses may be implemented in software or firmware stored in a memory and executed by a suitable instruction execution system. For example, if implemented in hardware, as in another embodiment, it may be implemented using any one or combination of the following techniques well known in the art: discrete logic circuits with logic gates for implementing logic functions on data signals, application specific integrated circuits with suitable combinational logic gates, programmable gate arrays (PGAs), field programmable gate arrays (FPGAs), and the like.

Those skilled in the art can understand that all or part of the steps carried by the method of implementing the above embodiments may be completed by a program to instruct related hardware, and the program may be stored in a computer readable storage medium. When executed, one or a combination of the steps of the method embodiments is included.

In addition, the functional units in the embodiments of the present disclosure can be integrated in one processing module or each unit may independently physically exists, or two or more units may be integrated into one module. The above integrated module may be implemented in the form of hardware, and can also be implemented in the form of a software functional module. If the integrated modules are implemented in the form of a software functional module and sold or used as an independent product, they can be stored in a computer-readable storage medium. The storage medium may be a read only memory, a magnetic disk or an optical disk, or the like.

In summary, the embodiments of the present disclosure can combine the online detection and the offline analysis to intercept the invading malicious SQL commands, and can also find and supplement the loopholes of the rules through offline analysis.

What is mentioned above is only the specific implementation of the present disclosure, but does not limit the protection scope of the present disclosure, and anyone skilled in the art may easily think of mortifications and alternations within the technical scope disclosed by the present disclosure, all of which should be contained within the protection scope of the present disclosure. Therefore, the protection scope of the claims shall prevail as the protection scope of the present disclosure.

What is claimed is:

1. A method for detecting a Structured Query Language (SQL) injection interception, comprising:
    detecting a received SQL instruction according to a SQL syntax tree rule to determine that the received SQL instruction is a malicious instruction; and analyzing the received SQL instruction by using an analysis model to determine that the received SQL instruction is a potentially malicious instruction, in a case that the received SQL instruction is not determined to be a malicious instruction according to the SQL syntax tree rule, wherein the step of analyzing the received SQL instruction by using an analysis model to determine that the received SQL instruction is a potentially malicious instruction comprises:
    generating a vector of the received SQL instruction according to a grammar rule;
    calculating a similarity between the vector of the received SQL instruction and a vector sample of a malicious SQL instruction; and
    determining the received SQL instruction, the vector of which has a similarity larger than a preset threshold, to be a malicious instruction.

2. The method of claim 1, wherein the step of detecting the received SQL instruction according to the SQL syntax tree rule to determine that the received SQL instruction is a malicious instruction comprises:
    parsing a SQL statement in the received SQL instruction into a syntax tree structure;
    determining that the syntax tree structure matches a feature of a syntax tree in a blacklist; and intercepting the SQL instruction with the matched syntax tree structure.

3. The method of claim 1, further comprising steps of:
    adding a syntax structure rule of the received SQL instruction to a blacklist in response to the received SQL instruction, in the case that the received SQL instruction is determined to be a malicious instruction.

4. A device for detecting a Structured Query Language (SQL) injection interception, comprising:
    a detection module, implemented in one or more processors executing instructions stored in one or more computer-readable memory, configured for detecting a received SQL instruction according to a SQL syntax tree rule to determine that the received SQL instruction is a malicious instruction; and an analysis module, implemented in the one or more processors executing instructions stored in the one or more computer-readable memory,
configured for analyzing the received SQL instruction by using an analysis model to determine that the received SQL instruction is a potentially malicious instruction, in a case that the received SQL instruction is not determined to be a malicious instruction according to the SQL syntax tree rule,
wherein the analysis module includes:
a vector generation submodule, implemented in the one or more processors executing instructions stored in the one or more computer-readable memory, configured for generating a vector of the received SQL instruction according to a grammar rule; and
a similarity calculation submodule, implemented in the one or more processors executing instructions stored in the one or more computer-readable memory, configured for calculating a similarity between the vector of the received SQL instruction and a vector sample of a malicious SQL instruction, and for determining the received SQL instruction, the vector of which has a similarity larger than a preset threshold, to be a malicious instruction.

5. The device of claim 4, wherein the detection module includes:
a parsing submodule, implemented in the one or more processors executing instructions stored in the one or more computer-readable memory, configured for parsing a SQL statement in the received SQL instruction into a syntax tree structure;
an intercepting submodule, implemented in the one ore more processors executing instructions stored in the one or more computer-readable memory, configured for determining that the syntax tree structure matches a feature of a syntax tree in a blacklist; and intercepting the SQL instruction with the matched syntax tree structure.

6. The device of claim 4, further comprising:
a blacklist update module implemented in the one or more processors executing instructions stored in the one or more computer-readable memory, configured for adding a syntax structure rule of the received SQL instruction to a blacklist in response to the received SQL instruction, in the case that the received SQL instruction is determined to be a malicious instruction.

7. A SQL injection interception detection apparatus, wherein the apparatus comprises:
one or more processors; and
a memory for storing one or more programs;
wherein the one or more processors executes the one or more programs to implement the method of claim 1.

8. A non-transitory computer readable medium storing a computer program, wherein a processor executes the computer program, to implement the method of claim 1.

* * * * *